United States Patent
Harder et al.

(10) Patent No.: US 9,845,389 B2
(45) Date of Patent: Dec. 19, 2017

(54) POLYAMIDE MOLDING MATERIAL, THE USE THEREOF, AND MOLDED PARTS PRODUCED THEREFROM

(75) Inventors: Philipp Harder, Chur (CH); Herbert Mossauer, Anyang-si (KR)

(73) Assignee: EMS-PATENT AG, Domat/Ems (CH)

( * ) Notice: Subject to any disclaimer, the term of this patent is extended or adjusted under 35 U.S.C. 154(b) by 675 days.

(21) Appl. No.: 14/360,543

(22) PCT Filed: Dec. 23, 2011

(86) PCT No.: PCT/EP2011/074036
§ 371 (c)(1),
(2), (4) Date: May 23, 2014

(87) PCT Pub. No.: WO2013/091737
PCT Pub. Date: Jun. 27, 2013

(65) Prior Publication Data
US 2014/0329944 A1 Nov. 6, 2014

(51) Int. Cl.
*B60C 1/00* (2006.01)
*C08L 77/06* (2006.01)
(Continued)

(52) U.S. Cl.
CPC .......... *C08L 77/06* (2013.01); *B29C 45/0001* (2013.01); *C08G 69/265* (2013.01);
(Continued)

(58) Field of Classification Search
None
See application file for complete search history.

(56) References Cited

U.S. PATENT DOCUMENTS

| 6,956,081 B2 | 10/2005 | Ebert |
| 2002/0173584 A1 | 11/2002 | Ebert |

(Continued)

FOREIGN PATENT DOCUMENTS

| CN | 101508839 | 8/2009 |
| EP | 2 354 176 | 8/2011 |

(Continued)

OTHER PUBLICATIONS

Two Office Actions (with English language translations) issued in JP counterpart application JP 2014-547727 (6 pages).
(Continued)

*Primary Examiner* — Ling Choi
*Assistant Examiner* — Thuy-Ai N Nguyen
(74) *Attorney, Agent, or Firm* — Greenblum & Bernstein, P.L.C.

(57) ABSTRACT

A polyamide molding material is proposed, which comprises at least one partially crystalline, partially aromatic polyamide (A) and at least one amorphous polyamide (B). The polyamides (A) and (B) together make up 30-60 wt.-% of the polyamide molding material. Furthermore, the polyamide molding material comprises 40-70 wt.-% glass fibers (C) having flat cross section, 0-15 wt.-% of at least one nonhalogenated flame retardant (D), and 0-10 wt.-% further additives (E), the components (A) to (E) adding up to 100 wt.-% of the polyamide molding material. The at least one partially crystalline, partially aromatic polyamide (A) has a glass transition temperature of at least 105° C. The polyamide molding material according to the invention is preferably distinguished in an injection-molding burr formation test in that, at a melt temperature of 320° C. and a tool temperature of 90° C., and a dynamic pressure of 100 bar and a holding pressure of 400 bar, at the flow path end of a mold arm having a vent gap dimension of 30 μm, burrs
(Continued)

having a length G of at most 30 μm result. Such a polyamide molding material results in molded parts having good surface quality and low warpage when injection molded and is suitable for the production of housings or housing parts of electrical and electronic devices.

24 Claims, 1 Drawing Sheet

(51) Int. Cl.
*C08G 69/26* (2006.01)
*C08G 69/36* (2006.01)
*C09K 21/12* (2006.01)
*B29C 45/00* (2006.01)
B29K 77/00 (2006.01)
B29K 105/00 (2006.01)
B29L 31/34 (2006.01)

(52) U.S. Cl.
CPC ............ *C08G 69/36* (2013.01); *C09K 21/12* (2013.01); *B29C 2945/00* (2013.01); *B29K 2077/00* (2013.01); *B29K 2105/0026* (2013.01); *B29L 2031/3481* (2013.01); *C08J 2377/10* (2013.01)

(56) References Cited

U.S. PATENT DOCUMENTS

| | | | |
|---|---|---|---|
| 2009/0062452 A1* | 3/2009 | Harder | C08G 69/26 524/494 |
| 2010/0249292 A1 | 9/2010 | Saga | |
| 2011/0184099 A1 | 7/2011 | Hewel | |
| 2013/0203910 A1 | 8/2013 | Zhang | |

FOREIGN PATENT DOCUMENTS

| | | |
|---|---|---|
| JP | 7-90178 | 4/1995 |
| JP | 2002-294071 | 10/2002 |
| JP | 2009-215534 | 9/2009 |
| JP | 2011-157548 | 8/2011 |
| JP | 2012051954 | 3/2012 |
| TW | 593540 593540 | 6/2004 |
| WO | WO 2010/117708 | 10/2010 |
| WO | WO 2011/126794 | 10/2011 |

OTHER PUBLICATIONS

Taiwan office Actions (with partial English language translation) issued in TW counterpart application 101144282 (6 pages).

\* cited by examiner

POLYAMIDE MOLDING MATERIAL, THE USE THEREOF, AND MOLDED PARTS PRODUCED THEREFROM

The invention relates to a polyamide molding material according to the preamble of independent claim 1, which comprises at least one partially crystalline, partially aromatic polyamide and at least one amorphous polyamide as well as glass fibers having flat cross section and optional additives, for example, flame retardants. Such molding materials are suitable, inter alia, for producing housings or housing parts or covers or panels for electric and electronic devices.

Such housings, e.g., for notebook computers or mobile telephones, are preferably produced from glass-fiber-reinforced plastics molding materials, typically by injection molding. They are to be lightweight and thin-walled, and are simultaneously to have high stiffness, low warpage, and outstanding surface quality. These molding materials must also simultaneously still be well processable, i.e., have a good flowing capability as the melt in injection molding, and preferably additionally also have flame retardant properties. Proposals have already been made for this requirement profile in the prior art.

A disadvantage of all previously described easily flowing polyamides is the formation of burrs (also called "flash" or "webbing") in glass-fiber-reinforced polyamides when polyamides are pressed during the compression phase into the tool parting line. The extent of the flash formation can be minimized by precision of the tool and optimization of the processing parameters, as described in Friedrich Johannaber, Walter Michaeli, Handbuch Spritzgiessen [Handbook of Injection Molding], second edition, Hanser Fachbuchverlag 2004, ISBN 9783446229662. However, especially injection-molded parts which are painted afterwards must frequently first be deburred in a time-consuming manner by hand, since the abrasion of the webbing during usage can result in edges with unclean colors and functional interference by plastic particles.

In addition to deburring by hand, there are manifold automated deburring methods for injection-molded parts, which emphasizes both the frequency of the occurrence of "flash" and also the necessity for postprocessing.

A polyamide molding material is disclosed in US 2010/0249292 A1, which contains a partially crystalline, preferably partially aromatic polyamide, an amorphous, preferably partially aromatic polyamide, a non-halogenated flame retardant, zinc borate as a synergist, and flat glass fibers. High stiffness, low warpage, and a good, glossy surface appearance are mentioned as examples. The housing for a notebook computer is specified as the preferred application.

A polyamide molding material which is identical per se, having an amorphous partially aromatic polyamide and flat glass fibers, is described in WO 2011/126794 A2, which originates from the same applicant as the preceding document, but which contains two partially crystalline polyamides, namely an aliphatic polyamide in addition to a partially aromatic polyamide. The additional advantage is that the high surface gloss of the parts produced therefrom is maintained even in environments having high temperature and high humidity. The applications relate to housings for portable electronic devices, such as mobile telephones, laptop and tablet computers, cameras, etc.

Comparative examples of the present application have shown, however, that the polyamide molding materials described in US 2010/0249292 A1 and WO 2011/126794 A2 result in parts having pronounced burrs at tool temperatures of 90° C.

The object of the present invention is therefore to provide a polyamide molding material having high flowability, which allows injection-molded parts having high surface quality, low warpage, and/or minimal burr formation.

The polyamide molding material according to the invention is preferably to be suitable for producing housings or housing parts or covers or panel elements for electrical and electronic devices.

This object is achieved according to the present invention with a polyamide molding material having the features of claim 1. This polyamide molding material according to the invention comprises:

at least one partially crystalline, partially aromatic polyamide (A);
    at least one amorphous polyamide (B);
    the polyamides (A) and (B) together making up 30-60 wt.-% (weight percent) of the polyamide molding material; and
    40-70 wt.-% glass fibers (C) with flat cross section;
    0-15 wt.-% of at least one nonhalogenated flame retardant (D); and
    0-10 wt.-% further additives (E);
the components (A) to (E) adding up to 100 wt.-% of the polyamide molding material.

This polyamide molding material according to the invention is further preferably characterized in that, in an injection-molding burr formation test at a melt temperature of 320° C. and a tool temperature of 90° C., and a dynamic pressure of 100 bar and a holding pressure of 400 bar at the flow path end of a mold arm having a vent gap dimension of 30 μm, burrs having a length G of at most 30 μm result. Alternatively to this requirement, the polyamide molding material according to the invention is characterized by the features of claim 3. In any case, the polyamide molding material according to the invention is additionally characterized in that the at least one partially crystalline, partially aromatic polyamide (A) has a glass transition temperature (Tg) of at least 105° C.

Further preferred features and embodiments of the polyamide molding material according to the invention result from the dependent claims. In addition, the use thereof and molded parts produced therefrom are claimed.

In a preferred embodiment, the polyamide molding material according to the invention is characterized in that the at least one partially crystalline, partially aromatic polyamide (A) has a glass transition temperature (measured by means of DSC) of 110-150° C., preferably 115-140° C., particularly preferably 115-135° C., very particularly preferably 120-135° C.

The relative viscosity (measured using 0.5 g polyamide in 100 ml m-cresol at 20° C.) of the partially crystalline, partially aromatic polyamide (A) is 1.45-2.0, preferably 1.5-1.9, particularly preferably 1.5-1.8.

The melting point (measured by means of DSC) of the partially crystalline, partially aromatic polyamide (A) is 300-330° C., preferably 305-325° C., particularly preferably 310-325° C.

If the glass transition temperature of the partially crystalline, partially aromatic polyamide (A) is excessively low, the polyamide molding material displays excessively low dimensional stability under heat. If it is excessively high, this results in decreased flowability and poor surface quality with wavy surface.

The glass transition temperature of the polyamide molding material as a whole is particularly preferably at least 120° C.

In a further preferred embodiment, the polyamide molding material according to the invention is characterized in that the burr length G at the flow path end of a mold arm having vent gap dimension of 30 μm is preferably at most 25 μm, particularly preferably at most 20 μm, specifically in the case of an injection-molded, six-armed test body having the dimensions of the arms of 90×10×1.5 mm, which is produced at a melt temperature of 320° C. and a tool temperature of 90° C., and a dynamic pressure of 100 bar and a holding pressure of 400 bar.

In a further preferred embodiment of the polyamide molding material according to the invention, the at least one partially crystalline, partially aromatic polyamide (A) is selected from the group consisting of PA 6T/6I/6, PA 6T/10T, PA 6T/6I, PA 6T/10T/6I/10I, and mixtures thereof.

The PA 6T/6I/6 preferably has the composition 62/16/22 mol-%. The glass transition temperature is then 125° C. and the melting point is 312° C.

The PA 6T/10T preferably has the composition 18/82 mol-%. The glass transition temperature is then 117° C. and the melting point is 295° C.

In the PA 6T/6I, the 6T component is preferably at least 60 mol-%. The 6T component in the PA 6T/6I is particularly preferably 70 mol-%. In the PA 6T/6I (70/30 mol-%), the glass transition temperature is 130° C. and the melting point is 325° C.

In a preferred embodiment, the polyamide molding material according to the invention is characterized in that the at least one partially crystalline, partially aromatic polyamide (A) is PA 6T/10T/6I/10I, which is synthesized from:
100 mol-% dicarboxylic acid component, composed of
  72.0-98.3 mol-% terephthalic acid and
  28.0-1.7 mol-% isophthalic acid; and
100 mol-% diamine component, composed of
  60.0-85.0 mol-% hexamethylene diamine and
  15.0-40.0 mol-% 1,10-decane diamine.

In a particularly preferred embodiment, the polyamide molding material according to the invention is characterized in that the at least one partially crystalline, partially aromatic polyamide (A) is PA 6T/10T/6I/10I, which is synthesized from:
100 mol-% dicarboxylic acid component, composed of
  75.0-95.0 mol-% terephthalic acid and
  25.0-5.0 mol-% isophthalic acid; and
100 mol-% diamine component, composed of
  60.0-75.0 mol-% hexamethylene diamine and
  25.0-40.0 mol-% 1,10-decane diamine.

In a very particularly preferred embodiment, the polyamide molding material according to the invention is characterized in that the at least one partially crystalline, partially aromatic polyamide (A) is PA 6T/10T/6I/10I, which is synthesized from:
100 mol-% dicarboxylic acid component, composed of
  80.0-90.0 mol-% terephthalic acid and
  20.0-10.0 mol-% isophthalic acid; and
100 mol-% diamine component, composed of
  62.0-72.0 mol-% hexamethylene diamine and
  28.0-38.0 mol-% 1,10-decane diamine.

In an especially preferred embodiment, the polyamide molding material according to the invention is characterized in that the at least one partially crystalline, partially aromatic polyamide (A) is PA 6T/10T/6I/10I, which is synthesized from:
100 mol-% dicarboxylic acid component, composed of
  86.4 mol-% terephthalic acid and
  13.6 mol-% isophthalic acid; and
100 mol-% diamine component, composed of
  66.7 mol-% hexamethylene diamine and
  33.3 mol-% 1,10-decane diamine.

The at least one amorphous polyamide (B) of the polyamide molding material is preferably selected from a group consisting of PA 6I/6T, PA 6I, PA MACMI/12, PA MACMI/MACMT/12, PA 6I/MACMI/12, PA 6I/6T/MACMI/MACMT, PA 6I/6T/MACMI/MACMT/12, PA MACMI/MACM12, PA MXDI, PA MXDI/6I, PA MXDI/MXDT/6I/6T, PA MXDI/12I, PA 6I/6T/6NDA, PA MACM12, PA MACM14, PA MACM18, PA NDT/INDT, PA MACMT/12, PA MACMI/MACMNDA, PA MACMT/MACMNDA, PA MACMI/MACM36, PA MACMT/MACM36, PA MACMT/MACM12, PA MACM6/11, PA 6I/6T/MACMI/MACMT/MACM12/612, PA 6I/6T/6NDA/MACMI/MACMT/MACMNDA, the laurin lactam being able to be entirely or partially replaced by caprolactam and/or the MACM being able to be replaced up to at most 20 mol-%, preferably up to at most 10 mol-%, by PACM. With respect to the naphthalene dicarboxylic acid content (abbreviated NDA) of the corresponding copolyamides, a quantity of at most 20 mol-% is preferred. The nomenclature of the polyamides in the above abbreviated notation conforms to ISO 1874-1: 1992(E).

Amorphous polyamides are understood as those polyamides which, in differential scanning calorimetry (DSC) according to ISO 11357 at a heating rate of 20 K/min, have a heat of fusion of at most 5 J/g, preferably at most 3 J/g, and particularly preferably at most 1 J/g.

The relative viscosity (measured using 0.5 g polyamide in 100 ml m-cresol at 20° C.) of the amorphous polyamide (B) is 1.35-2.15, preferably 1.40-1.90, particularly preferably 1.45-1.85. The glass transition temperature (measured by means of DSC) of the amorphous polyamide (B) is 100-230° C., preferably 110-200° C., particularly preferably 120-190° C.

The at least one amorphous polyamide (B) is particularly preferably a PA 6I/6T, in which the portion of the isophthalic acid in relation to the sum of isophthalic acid and terephthalic acid in the PA 6I/6T is 90 to 57 mol-%, preferably 85 to 60 mol-%, particularly preferably 75 to 60 mol-%, and very particularly preferably 72 to 63 mol-%.

The relative viscosity (measured using 0.5 g polyamide in 100 ml m-cresol at 20° C.) of the amorphous PA 6I/6T is 1.38-1.70, preferably 1.43-1.65, particularly preferably 1.48-1.62. The glass transition temperature (measured by means of DSC) of the amorphous PA 6I/6T is 120-135° C.

With respect to the quantity ratio between the polyamides (A) and (B) in the polyamide molding material according to the invention, it is preferable that the weight ratio of the at least one partially crystalline, partially aromatic polyamide (A) to the at least one amorphous polyamide (B) is in the range of 30:70 to 70:30, preferably in the range of 40:60 to 65:35, particularly preferably in the range of 40:60 to 60:40, very particularly preferably in the range of 45:55 to 56:44, and especially preferably in the range of 45:55 to 49:51.

At a portion of the amorphous polyamide (B) of less than 30 wt.-%, the polyamide molding material crystallizes excessively rapidly during the injection-molding processing, and the injection-molded parts have a higher crystallinity on the surface. At a portion of the amorphous polyamide (B) of greater than 70 wt.-%, the dimensional stability under heat of the polyamide molding material is excessively low.

The HDT A (1.80 MPa) of the polyamide molding material according to the invention is at least 150° C., preferably at least 160° C.

Furthermore, the polyamide molding material according to the invention displays good toughness.

Together, the quantity of the polyamides (A) and (B) in the polyamide molding material according to the invention is preferably 38 to 55 wt.-%, particularly preferably 43 to 55 wt.-%, in relation to 100 wt.-% of the polyamide molding material.

In a further embodiment, the polyamide molding material according to the invention only comprises one polyamide (A) and one polyamide (B) each.

The quantity of the glass fibers (C) with flat cross section is preferably 45 to 62 wt.-%, particularly preferably 45 to 57 wt.-%, in relation to 100 wt.-% of the polyamide molding material.

The glass fibers used have a noncircular, flat cross section. Such glass fibers are also designated as flat glass fibers or planar glass fibers. A flat cross section is understood as all geometries which are flattened in relation to a circular shape, i.e., the flat cross section can be oval, elliptical, elliptical with constriction (so-called cocoon fiber), flattened, polygonal, rectangular, or nearly rectangular. The appearance of the glass fibers can be stretched or spiral-shaped. Short or long glass fibers can be used. Glass fibers made of all types of glass, e.g., A-, C-, D-, E-, M-, S-, R-glass, or arbitrary mixtures thereof can be used, glass fibers made of E glass or glass fibers made of mixtures with E glass or mixtures with E glass fibers are preferred.

In the flat glass fibers, the aspect ratio of the cross section, i.e., the ratio of the main cross-sectional axis (the longest distance in cross section) to the secondary cross-sectional axis (the longest distance perpendicular to the main cross-sectional axis) is preferably 1.5 to 8, particularly preferably 2 to 6, and very particularly preferably 3 to 5.

The cross-sectional axes of the flat glass fibers are 3 to 40 μm long. The length of the secondary cross-sectional axis is preferably 3 to 20 μm, particularly preferably 4 to 10 μm, and the length of the main cross-sectional axis is 6 to 40 μm, particularly preferably 12 to 30 μm.

The flat glass fibers can be equipped with a suitable sizing or adhesion promoter system. For this purpose, for example, systems based on silanes, titanates, polyamides, urethanes, polyhydroxyethers, epoxides, nickel, or combinations or mixtures thereof, respectively, can be used.

The polyamide molding material according to the invention preferably contains at least one nonhalogenated flame retardant (D), which is preferably provided in a quantity of 0 to 13 wt.-%, particularly preferably in a quantity of 9 to 13 wt.-%, and very particularly preferably in a quantity of 10 to 12 wt.-% in the polyamide molding material.

Preferably, triazines, triazine derivates, phosphaphenanthrenes, phosphazanes, phosphazenes, polyphosphazenes, metal hydroxides, and phosphinic acid salts with or without synergist are used as the nonhalogenated, i.e., halogen-free flame retardant.

The at least one nonhalogenated flame retardant (D) preferably comprises a flame retardant containing phosphorus, preferably phosphinic acid salts. Phosphinic acid salts are to be understood as salts of phosphinic acid and/or diphosphinic acid and/or the polymers thereof.

Phosphinic acid salts of the general formula (I) and/or formula (II) and/or the polymers thereof are preferably used as the phosphinic acid salts:

(I)

(II)

where
R1, R2 are identical or different and are preferably C1-C8 alkyl, linear or branched, saturated, unsaturated, or partially unsaturated, and/or aryl;
R3 is C1-C10 alkylene, linear or branched, saturated, unsaturated, or partially unsaturated, C6-C10 arylene, alkylarylene, or aryl alkylene;
M is a metal ion from the second or third main group or secondary group of the periodic system, preferably aluminum, barium, calcium, and/or zinc; and m=2 or 3; n=1 or 3; x=1 or 2.

Preferably, aluminum, barium, calcium, and zinc are used as the metal ion M. Suitable phosphinic acids for the production of the phosphinic acid salts according to the invention are, for example, dimethyl phosphinic acid, ethylmethyl phosphinic acid, diethyl phosphinic acid, methyl-n-propyl phosphinic acid, methane-di(methyl phosphinic acid), ethane-1,2-di(methyl phosphinic acid), hexane-1,6-di(methyl phosphinic acid), benzene-1,4-di(methyl phosphinic acid), methyl-phenyl phosphinic acid, diphenyl phosphinic acid. The phosphinic acid salts can be produced, e.g., in that the phosphinic acids are reacted in aqueous solution with metal carbonates, metal hydroxides, or metal oxides, monomers essentially resulting, depending on the reaction conditions under certain circumstances also polymeric phosphinic acid salts.

Nitrogen-containing compounds, nitrogen-containing and phosphorus-containing compounds, metal borates, metal carbonates, metal hydroxides, metal hydroxy oxides, metal nitrides, metal oxides, metal phosphates, metal sulfides, metal stannates, metal hydroxy stannates, silicates, zeolites, basic zinc silicate, and/or silicic acids are preferred as the synergist. Aluminum, barium, calcium, magnesium, manganese, titanium, zinc, and/or tin are preferably used as the metals.

Examples of synergists are melamine, melamine derivatives of cyanuric acid, melamine derivatives of isocyanuric acid, melamine cyanurate, condensation products of melamine, e.g., melem, melam, or melon, reaction products of melamine or condensation products of melamine with pyrophosphoric acid, reaction products of melamine or condensation products of melamine with polyphosphoric acid, melamine sulfate, melamine pyrosulfate, guanidine derivatives, ammonium polyphosphate, ammonium hydrogen phosphate, ammonium dihydrogen phosphate, aluminum hydroxide, synthetic aluminum metahydroxide (synthetic aluminum hydroxy oxide), natural aluminum metahydroxide (natural aluminum hydroxy oxide), aluminum oxide, calcium borate, calcium carbonate, calcium magnesium carbonate, calcium oxide, calcium sulfide, iron oxide, magnesium borate, magnesium carbonate, magnesium hydroxide, magnesium oxide, magnesium sulfide, manganese hydroxide, manganese oxide, titanium nitride, titanium dioxide, zinc borate, zinc carbonate, zinc hydroxide, zinc nitride, zinc oxide, zinc phosphate, zinc sulfide, zinc stannate, basic zinc silicate, tin oxyhydrate, and combinations thereof.

In a preferred embodiment, phosphinic acid salts in combination with melamine cyanurate, dimelamine pyrophosphate, melamine polyphosphate, melem polyphosphate, melam polyphosphate, melon polyphosphate, melamine pyrosulfate, dicyandiamide, ammonium polyphosphate, aluminum hydroxide, synthetic aluminum metahydroxide (synthetic aluminum hydroxy oxide), natural aluminum metahydroxide (natural aluminum hydroxy oxide), calcium carbonate, calcium magnesium carbonate, iron oxide, magnesium carbonate, magnesium hydroxide, zinc metaborate, zinc carbonate, zinc nitride, zinc sulfide, zinc stannate, zinc hydroxy stannate, basic zinc silicate, and/or tin oxyhydrate are used as the halogen-free flame retardant.

Finally, the polyamide molding material according to the invention can also comprise up to 10 wt.-% further additives (E), preferably in a quantity of 0 to 8 wt.-%, particularly preferably 0.1 to 6 wt.-%, and very particularly preferably 1 to 6 wt.-%.

The further additive can be selected from a group consisting of inorganic stabilizers, organic stabilizers, lubricants, polytetrafluoroethylene, colorants and marking materials, inorganic pigments, organic pigments, IR absorbers, antistatic agents, antiblocking agents, conductivity additives, carbon black, graphite, carbon nanotubes, demolding agents, parting agents, optical whiteners, photochromic additives, foreign polymers, impact toughness modifiers, adhesion promoters, anti-dripping agents, metallic pigments, metal glitter, metal coated particles, fillers and reinforcing agents, in particular nanoscale fillers and reinforcing agents, e.g., minerals having a particle size of at most 100 nm, or unmodified or modified, natural or synthetic phyllosilicates or mixtures thereof.

The further additives can also be added in masterbatch form. A polyamide is preferably used as the base polymer of the masterbatch. This polyamide is preferably selected from the group consisting of PA 6, PA 66, PA 12, PA 1012, PA 1212, PA 6/12, PA 6/66, PA 6/69, and mixtures thereof. The polyamide introduction into the polyamide molding material according to the invention by the use of masterbatches is at most 5 wt.-%, preferably at most 3 wt.-% in relation to the total polyamide molding material.

The lubricants are preferably selected from a group containing ethylene bisstearamide, oleic acid amide, stearic acid amide, aluminum tristearate, oxidized or non-oxidized polyethylene waxes, oxidized or non-oxidized polypropylene waxes, salts of oxidized or non-oxidized polyethylene waxes, salts of oxidized or non-oxidized polypropylene waxes, monocarboxylic acids, dicarboxylic acids, salts of monocarboxylic acids, salts of dicarboxylic acids, esters of monocarboxylic acids, esters of dicarboxylic acids, and mixtures thereof. The lubricants are preferably added in quantities of at most 2 wt.-% in relation to the total polyamide molding material.

Among the monocarboxylic acids, stearic acid, palmitic acid, arachidic acid, behenic acid, montanic acids, lauric acid, myristic acid, 12-hydroxystearic acid, and mixtures thereof are preferred. Among the dicarboxylic acids, naphthalene dicarboxylic acid, isophthalic acid, terephthalic acid, and mixtures thereof are preferred.

For the salts, barium, calcium, magnesium, zinc, potassium, copper, and/or cobalt salts are preferably used.

In the polyamide compositions according to the invention, e.g., antioxidants, antiozonants, light protection agents, UV stabilizers, UV absorbers, or UV blockers can be used as stabilizers or aging protection agents, respectively.

All particulate fillers known to a person skilled in the art come into consideration as the fillers. These include in particular particulate fillers selected from the group consisting of minerals, talc, mica, dolomite, silicates, quartz, titanium dioxide, wollastonite, kaolin, silicic acids, magnesium carbonate, magnesium hydroxide, chalk, ground glass, glass flakes, ground carbon fibers, ground or precipitated calcium carbonate, limestone, feldspar, barium sulfate, permanent-magnetic or magnetizable metals or alloys, glass beads, hollow glass beads, hollow-spherical silicate fillers, synthetic layered silicates, natural layered silicates, and mixtures thereof.

Further reinforcing agents can be selected from the fibrous or reinforcing fillers known to a person skilled in the art, preferably from the group consisting of carbon fibers, metal fibers, aramid fibers, polymer fibers, whiskers, mineral fibers, and mixtures thereof.

Whiskers are to be understood as needle-shaped single crystals made of metals, oxides, borides, carbides, nitrides, polytitanate, carbon, etc., typically having polygonal cross section, e.g., potassium titanate, aluminum oxide, and silicon carbide whiskers and mixtures thereof. Whiskers generally have a diameter of 0.1 to 10 μm and a length in the millimeter to centimeter range. They simultaneously have a high tensile strength. Whiskers can be produced by deposition from the gas phase on the solid (VS mechanism) or from a three-phase system (VLS mechanism).

The fillers or reinforcing agents can be surface treated. This can be performed using a suitable sizing or adhesion promoter system. For this purpose, for example, systems based on fatty acids, waxes, silanes, titanates, polyamides, urethanes, polyhydroxy ether, epoxides, nickel, or combinations or mixtures thereof, respectively, can be used.

In the polyamide compositions according to the invention, e.g., kaolins, serpentines, talcum, mica, vermiculite, muscovite, illite, smectite, saponite, montmorillonite, hectorite, double hydroxides, or mixtures thereof can be used as the phyllosilicates. The layered silicates can be surface treated (modified), or also untreated (unmodified).

In the polyamide compositions according to the invention, for example, carbon black and/or carbon nanotubes, also called carbon nanofibrils, can be used as anti-static agents and/or conductivity additives. The use of carbon black can also be used to improve the black coloration of the polyamide compositions, however.

The polyamide molding material according to the invention is advantageously characterized in that a standard test body, which is produced from such a molding material and injection molded at a melt temperature of 320° C. and a tool temperature of 90° C., having plate-shaped dimensions of 60×60×2 mm, has a warpage, calculated as the difference between the transverse and longitudinal processing shrinkage according to ISO standard 294, of at most 0.22%, preferably of at most 0.19%.

The relative evaluation scale used for the visibility of the joint line, sink marks, and surface quality is based on the quality requirements of the final customers for injection-molded mobile telephone and notebook housings. The grade 1 means that the entire surface of the corresponding injection-molded parts in the untreated state and after possible metal plating appears completely uniform at an arbitrary viewing angle, and no indications of the extension of joint lines or ribs located under the surface are to be recognized. The grade 2 for the surface quality means that at positions away from the sprue, with intentionally delayed injection speed, slight glass fiber erosions are to be recognized. With respect to sink marks and joint line, the grade 2 means that they are recognizable in the untreated state with a critical eye in oblique incident light. The grade 2 precludes subsequent metal plating of surface parts, since all types of irregularities are thus made clearly visible. Parts having the grade 3 or worse will no longer be accepted by the final customers.

To produce the polyamide molding material, the polymer components are melted and mixed in the viscous molten state. The reinforcement material (glass fibers) can be metered via a gravimetric metering scale with the polymer components into the intake or via a side feeder into the melt. This is performed on typical compounding machines, e.g., single-shaft or dual-shaft extruders or screw kneaders. The other components (additives, color pigments) can be fed with the polymer components into the intake, separately via a side feeder, or in the form of a dry blend.

The dry granules and optionally further additives are mixed for the dry blend production. This mixture is homogenized for 10-40 min. by means of a tumble mixer, drum hoop mixer, or tumble dryer. To avoid moisture absorption, this can be performed under dry protective gas.

The compounding is performed at set cylinder temperatures of 250° C. to 320° C. Vacuum can be applied or degassing can be performed to the atmosphere before the nozzle. The melt is extruded in strand form, cooled in the water bath at 10 to 80° C., and subsequently granulated. The granules are dried for 12-24 hours at 80 to 120° C. under nitrogen or in vacuum to a water content of less than 0.1 wt.-%.

Molded parts produced by injection molding from a polyamide molding material according to the invention are characterized, inter alia, that the molded part has an amorphous or less crystallized surface region and a partially crystalline core region.

The polyamide molding materials according to the invention are preferably used for the injection molding of housings or housing parts or covers and panel elements in particular for electrical and electronic devices, office automation devices, hi-fi and TV devices, entertainment electronics, stationary and portable computers, in particular laptop computers, notebooks, netbooks, and tablet PCs, game consoles, lighting devices, preferably having LEDs, installed devices in automobile dashboards, navigation devices, measuring devices, personal digital assistants, telecommunication devices, cameras, watches or clocks, computers, electronic storage devices, keyboards, music recorders, digital music playback devices (e.g., CD and MP3 players, iPods), e-books, mobile telephones, and smart phones.

DETAILED DESCRIPTION OF THE INVENTION

The present invention will be explained in greater detail on the basis of the following examples, which merely illustrate the invention but are not to restrict it.

The following materials were used in the examples and comparative examples, as listed in Table is (polyamides) and Table 1b (additives):

TABLE 1a polyamides used

| components | description | trade name | producer |
|---|---|---|---|
| polyamide (A) | partially crystalline copolyamide made of hexamethylene diamine (66.7 mol-%), terephthalic acid (86.4 mol-%), isophthalic acid (13.6 mol-%), and 1,10-decane diamine (33.3 mol-%), in abbreviated notation PA 6T/10T/6I/10I RV 1.75, melting point 318° C., glass transition temperature 129° C. | — | EMS-CHEMIE AG, Switzerland |
| PA 6I/6T | amorphous co-polyamide 6I/6T (66.7/33.3 mol-%) made of hexamethylene diamine, isophthalic acid, and terephthalic acid RV 1.53, glass transition temperature 125° C. | — | EMS-CHEMIE AG, Switzerland |
| PA 6T/66 | partially crystalline co-polyamide 6T/66 (52/48 mol-%) made of hexamethylene diamine, terephthalic acid, and adipic acid RV 1.72, melting point 310° C., glass transition temperature 95° C. | — | EMS-CHEMIE AG, Switzerland |
| PA 66 | polyamide 66 made of hexamethylene diamine and adipic acid RV 1.75, melting point 260° C., glass transition temperature 70° C. | Radipol A 45 | Radici Chimica, Italy |

RV = relative viscosity, measured on a solution of 0.5 g polyamide in 100 ml m-cresol at 20° C.

TABLE 1b additives used

| components | description | trade name | producer |
|---|---|---|---|
| glass fibers, flat | glass fibers, flat, 3 mm long, main cross-sectional axis 28 µm, secondary cross-sectional axis 7 µm, aspect ratio of the cross-sectional axes = 4 | NITTOBO CSG3PA-820 | Nitto Boseki Co., Ltd., Japan |
| glass fibers, round | glass fibers, round 4.5 mm long, diameter 10 µm | 995 EC10-4.5 | Saint-Gobain Vetrotex, France |
| phosphinic acid salt | aluminum diethyl phosphinate | Exolit OP 1230 | Clariant GmbH, Germany |
| aluminum metahydroxide | aluminum metahydroxide, ground | Actilox 200 SM | Nabaltec, Germany |
| zinc borate | hexaboron dizinc undecaoxide | Firebrake 500 | Borax Europe Ltd., United Kingdom |
| PA 6T/6I oligomer | copolyamide 6T/6I oligomer (70/30 mol-%) made of hexamethylene diamine, terephthalic acid, and isophthalic acid RV 1.14 | — | EMS-CHEMIE AG, Switzerland |
| black masterbatch | masterbatch based on polyamide 6 with 25 wt.-% carbon black (carbon black Corax N115 from Evonik Germany) | — | EMS-CHEMIE AG, Switzerland |
| heat stabilizer | N,N'-hexane-1,6-diylbis[3-(3,5-di-tert-butyl-4-hydroxyphenyl)propionamide] | Irganox 1098 | BASF SE, Germany |
| 2,6-NDA | naphthalene-2,6-dicarboxylic acid | 2,6-NDA | Novolyte Technologies, Belgium |
| lubricant | montanic acids, CAS number 68476-03-9 | Licowax S | Clariant GmbH, Germany |

PRODUCTION OF THE POLYAMIDE MOLDING MATERIALS FOR THE EXAMPLES AND COMPARATIVE EXAMPLES

The dried polyamide granules were mixed with the additives. This mixture was homogenized for 30 min. under protective gas by means of a tumble mixer. This dry blend was metered via a scale into the intake of a dual-shaft extruder from Werner & Pfleiderer of the type ZSK 25. The glass fibers were conveyed via a side feeder six housing units in front of the nozzle into the polymer melt. The temperature of the first housing was set to 80° C., that of the remaining housings to 310° C. A speed of 200 RPM and a throughput of 15 kg/h was used and atmospheric degassing was performed. The strands were cooled in the water bath, cut, and the granules obtained were dried at 120° C. under vacuum (residual pressure 50 mbar) for 24 hours to a water content less than 0.1 wt.-%.

If not otherwise noted in the description of the test methods, testing bodies were subsequently produced from the granules on an injection-molding machine from Arburg, model Allrounder 420 C 1000-250. A melt temperature of the polyamide molding material melt of 320° C. and a tool temperature of 90° C. were set. The testing bodies were stored for 48 hours at room temperature over silica gel before the measurement.

Figure 1:
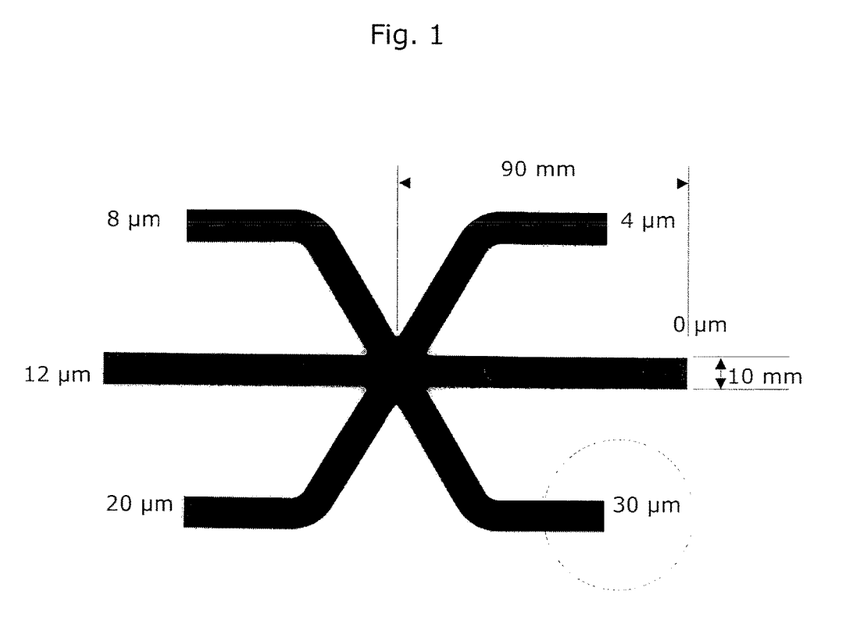
FIG. 1 shows vent gap dimensions.
Figure 2:
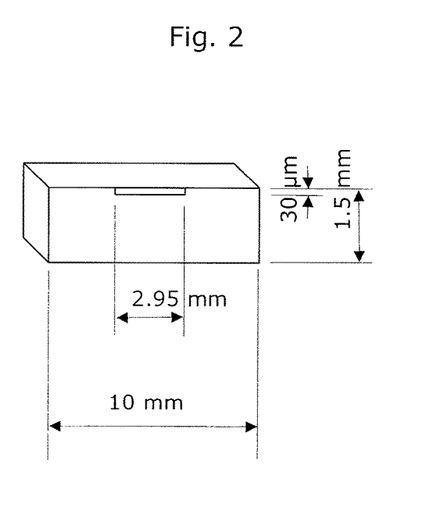
FIG. 2 shows a vent width.
Figure 3:
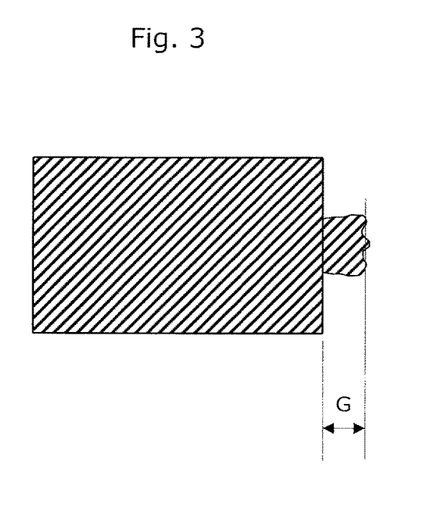
FIG. 3 shows a burr length of a test body.

The Measurements were Performed According To The Following Test Methods and Standards:

Spiral Flow Test:
  The flow spirals were produced on an injection-molding machine from Arburg, model Allrounder 320-210-750 at a melt temperature of 320° C. and a tool temperature of 90° C. with an injection pressure of 1000 bar. The flow spirals had their sprue gate in the center and a cross section of 1.5×10 mm. The following distance marks were applied in the spirals:
    points at an interval of 1 mm
    strokes at full centimeters
    length specifications every 5 cm
Tensile Modulus of Elasticity:
  ISO 527 at a pulling speed of 1 mm/min
  ISO tension bar, standard: ISO/CD 3167, type A1, 170×20/10×4 mm, temperature 23° C.
Relative Viscosity (RV)
  ISO 307
  0.5 g polyamide in 100 ml m-cresol
  temperature 20° C.
  calculation of the relative viscosity (RV) according to $RV=t/t_0$ based on section 11 of the standard.
Melting Point (Tm) and Glass Transition Temperature (Tg)
  standard 11357
  granules having a water content of less than 0.1 wt.-%
  Differential scanning calorimetry (DSC) was performed at a heating rate of 20 K/min. For the melting point, the temperature was specified at the peak maximum, for the glass transition temperature, the temperature was specified at the onset.
HDT (Heat Distortion Temperature, Dimensional Stability Under Heat)
  ISO 75
  ISO test bar, standard: ISO/CD 3167, type B1, 80×10×4 mm
  HDT A load 1.80 MPa
Burr Formation Test:
  The tool used for the determination of the burr formation is a two-plate tool having a six-armed test body with central sprue gate. The length, width, and thickness of the arms are 90×10×1.5 mm. Vents are located at the beginning and at the end of each arm. The vents at the flow path end have different gap dimensions. The gap dimensions of the individual vents are 0, 4, 8, 12, 20, and 30 µm, as indicated in FIG. 1. The width of the vents is 2.95 mm (cf. FIG. 2). The burr length G (cf. FIG. 3) of the test body was evaluated at the flow path end of the arm having the vent gap dimension 30 µm. In Detail FIGS. 2 and 3, which show the end of the test body arm having 30 μm vent gap dimension, the components are not to scale, but rather shown schematically, so that the principle can be seen therefrom. In FIG. 3, the material burr protruding beyond the end of the test body arm, which has penetrated into the vent gap at the flow path end, is shown exaggeratedly large for illustration, and the burr length G is designated.

These test bodies are manufactured on an injection-molding machine of the type Krauss Maffei 100-380CX. The parts are removed by hand, since otherwise damage to the burrs can occur. The injection speed is 100 mm/s, the screw speed 50 RPM, the dynamic pressure 100 bar, and the holding pressure 400 bar. 320° C. is used as the melt temperature and 90° C. is used as the tool temperature.

The burr length G is determined based on images, which are recorded using a microscope of the type Leica/Wild M420 photomacroscope at a 40 to 50 fold magnification, by means of use of the focusing lens 2.0×, the burr being imaged in its entire width. The burr length G results from the distance between the base line (test body end) and the measuring line. The measuring line is laid so that the area of the indentations and bulges compensate for one another (cf. FIG. 3). The arithmetic mean value from the measurements on 5 different test bodies is specified.

Processing Shrinkage:

ISO 294-4 plate, type D2, 60×60×2 mm (according to standard ISO 294-3)

The plates are produced at a melt temperature of 320° C. and a tool temperature of 90° C. They are stored for 48 hours at room temperature over silica gel before the measurement. The processing shrinkage is determined longitudinally and transversely to the flow direction in relation to the mold cavity dimension. The arithmetic mean value from the measurements on 5 plates is specified.

Fire Test

UL-94 of Underwriters Laboratories test bar 125×13×0.45 mm

Each 5 test bodies are conditioned for at least 48 hours at 23° C. and 50% relative humidity (point 6.1 of UL-94). Each 5 test bodies are conditioned for 168 hours at 70° C. and subsequently cooled in an exsiccator for at least 4 hours at room temperature (point 6.2 of UL-94).

The two sets of 5 test bodies each are subjected to the vertical fire test, which each of the sets must withstand. In the vertical fire test, the 5 test bodies of a set are each exposed to flame 2 times. The classification V0 is achieved if the self-extinguishing of each individual test body occurs after at most 10 seconds and the sum of the burning lengths of both flame exposures over all 5 test bodies is at most 50 seconds. The self-extinguishing and the smoldering after the second flame exposure must be ended after 30 seconds in each individual test body. No test body may burn down to the chucking clamp. Possibly occurring drips may not ignite the cotton wool.

The four examples 1 to 4 according to the invention are represented in the following Table 2. Example 4 is a variant with flame retardant.

TABLE 2 examples according to the invention

| | | | examples | | | |
|---|---|---|---|---|---|---|
| | | unit | 1 | 2 | 3 | 4 |
| partially crystalline PA | polyamide (A) | wt.-% | 24.85 | 25.95 | 21.95 | 23.5 |
| amorphous PA | PA 6I/6T | wt.-% | 20 | 21 | 25 | 13 |
| filler | glass fibers, flat | wt.-% | 50 | 50 | 50 | 50 |
| flame retardant 1 | phosphinic acid salt | wt.-% | — | — | — | 9 |
| flame retardant 2 | aluminum metahydroxide | wt.-% | — | — | — | 1.5 |
| additives | PA 6T/6I oligomer | wt.-% | 2.5 | — | — | — |
| | black masterbatch | wt.-% | 1.6 | 1.6 | 1.6 | 1.6 |
| | heat stabilizer | wt.-% | 0.25 | 0.25 | 0.25 | 0.2 |
| | 2,6-NDA | wt.-% | 0.4 | 0.8 | 0.8 | 1 |
| | lubricant | wt.-% | 0.4 | 0.4 | 0.4 | 0.2 |
| | glass transition temperature | ° C. | 126 | 127 | 125 | 124 |
| | tensile modulus of elasticity | MPa | 17600 | 17500 | 17000 | 18000 |
| | flow length | mm | 265 | 300 | 300 | 330 |
| | HDT A (1.80 MPa) | ° C. | 250 | 180 | 160 | 280 |
| | burr length G (vent gap dimension 30 μm) | μm | 17 | 20 | 19 | 23 |
| | visibility of the joint line* | — | 2 | 2 | 1 | 2 |
| | sink marks* | — | 1 | 1 | 1 | 2 |
| | surface quality* | — | 1 | 1 | 1 | 1 |
| | UL 94 at 0.45 mm | — | — | — | — | V0 |
| | processing shrinkage | | | | | |
| | longitudinal | % | 0.06 | 0.08 | 0.05 | 0.05 |
| | transverse | % | 0.23 | 0.26 | 0.20 | 0.20 |
| | warpage** | % | 0.17 | 0.18 | 0.15 | 0.15 |

*visual evaluation (scale 1-5): 1 = very good, 5 = very poor
**warpage = difference of the processing shrinkage transversely and longitudinally The good to very good evaluation of the surface appearance (even in the flame retardant variant) and the extremely low warpage in these four examples according to the invention clearly verify the surprising effect of the polyamide molding compound according to the invention.

This progress according to the invention is very clear upon the direct comparison to test bodies which were produced according to previously known polyamide molding materials, and which were compounded, injection molded, and tested in the same manner and on the same machines as the examples according to the invention, and are therefore directly comparable. Recipes from the cited documents of the prior art were also reproduced. Comparative examples numbers 5 to 11 are compiled in following Table 3.

polyamide (A) according to EP 2 354 176 A1, but as a component of a novel polyamide molding material according to the present invention, outstanding properties are achieved with respect to burr formation, warpage, and surface quality, which are significantly better both in relation to EP 2 354 176 A1 and also in relation to the closest prior art.

TABLE 3

| | | | comparative examples | | | | | | |
|---|---|---|---|---|---|---|---|---|---|
| | | unit | 5 | 6 | 7 | 8 | 9 | 10 | 11 |
| partially crystalline PA | polyamide (A) | wt.-% | 25.95 | — | 47.35 | 36.5 | — | — | — |
| | PA 6T/66 | wt.-% | — | — | — | — | 25.9 | 15.95 | 10.3 |
| | PA 66 | wt.-% | — | 26.35 | — | — | — | — | 17.4 |
| amorphous PA | PA 6I/6T | wt.-% | 21 | 21 | — | — | 11.1 | 21.55 | 6.8 |
| filler | glass fibers, flat | wt.-% | — | 50 | 50 | 50 | 50 | 50 | 50 |
| | glass fibers, round | wt.-% | 50 | — | — | — | — | — | — |
| flame retardant 1 | phosphinic acid salt | wt.-% | — | — | — | 9 | 9 | 9 | 13 |
| flame retardant 2 | aluminum metahydroxide | wt.-% | — | — | — | 1.5 | 1.5 | 1.5 | 1 |
| | zinc borate | wt.-% | — | — | — | — | 0.6 | 0.1 | 0.3 |
| additives | black masterbatch | wt.-% | 1.6 | 1.6 | 1.6 | 1.6 | 1 | 1 | 1 |
| | heat stabilizer | wt.-% | 0.25 | 0.25 | 0.25 | 0.2 | — | — | — |
| | 2,6-NDA | wt.-% | 0.8 | 0.4 | 0.4 | 1 | 0.7 | 0.7 | 0.5 |
| | lubricant | wt.-% | 0.4 | 0.4 | 0.4 | 0.2 | 0.2 | 0.2 | — |
| | glass transition temperature | ° C. | 127 | 77 | 127 | 128 | 112 | 117 | 82 |
| | tensile modulus of elasticity | MPa | 17500 | 17000 | 18000 | 18300 | 18400 | 18000 | 17000 |
| | flow length | mm | 270 | 265 | 240 | 330 | 280 | 280 | 260 |
| | HDT A (1.80 MPa) | ° C. | 270 | 245 | *** | *** | 250 | 200 | 250 |
| | burr length G (vent gap dimension 30 μm) | μm | 15 | 87 | 45 | 38 | 41 | 60 | 80 |
| | visibility of the joint line* | — | 2 | 2 | 3 | 3 | 4 | 2 | 3 |
| | sink marks* | — | 2 | 4 | 3 | 3 | 3 | 2 | 3 |
| | surface quality* | — | 4 | 2 | 4 | 4 | 3 | 2 | 2 |
| | UL 94 at 0.45 mm | — | — | — | — | V0 | V0 | V0 | V0 |
| | processing shrinkage longitudinal | % | 0.10 | 0.10 | 0.15 | 0.15 | 0.15 | 0.10 | 0.12 |
| | transverse | % | 0.60 | 0.45 | 0.50 | 0.50 | 0.45 | 0.35 | 0.47 |
| | warpage** | % | 0.50 | 0.35 | 0.35 | 0.35 | 0.30 | 0.25 | 0.35 |

*visual evaluation (scale 1-5): 1 = very good, 5 = very poor
**warpage = difference of the processing shrinkage transversely and longitudinally
***HDT A higher than the maximum oil temperature of 280° C.

The molding material of comparative example 5 having round glass fibers displays poor surface quality and significant warpage. Comparative example 6 having flat glass fibers and low glass transition temperature has good surface quality, but strong sink marks. The molding material of comparative example 6 additionally has extremely strong burr formation.

The molding materials of comparative examples 9 and 10, which correspond to US 2010/0249292 A1, and the molding material of comparative example 11, which corresponds to WO 2011/126794 A2, also display strong burr formation. Finally, the molding materials of comparative examples 7 and 8, which correspond to EP 2 354 176 A1, have received a poor evaluation in all regards.

EP 2 354 176 A1 discloses a partially crystalline, partially aromatic polyamide (A) as a polyamide component in a molding material, from which components may be produced, which can be soldered at 260° C. and higher temperatures, without forming bubbles during the soldering process.

In consideration of the latter circumstance, it is all the more astounding and completely unexpected that using a It could therefore be shown on the basis of the examples that the polyamide molding materials according to the invention result in improved property combinations in relation to the polyamide molding materials previously known from the corresponding prior art with respect to burr formation, warpage, sink marks, and/or surface quality.

The invention claimed is:
1. A polyamide molding material comprising:
at least one partially crystalline, partially aromatic polyamide (A) selected from a group consisting of PA 6T/6I /6, PA 6T/10T, PA 6T/10T/6I/10I and mixtures thereof;
at least one amorphous polyamide (B);
a weight ratio of the at least one partially crystalline, partially aromatic polyamide (A) to the at least one amorphous polyamide (B) being in the range of 30:70 to 70:30;
the at least one polyamide (A) and the at least one polyamide (B) together making up 30 -60 wt.-% of the polyamide molding material;
40-70 wt.-% glass fibers (C) with flat cross section;
0-15 wt.-% of at least one nonhalogenated flame retardant (D); and

0-10 wt.-% further additives (E);
the components (A) to (E) adding up to 100 wt.-% of the polyamide molding material;
wherein the polyamide molding material, in an injection-molding burr formation test at a melt temperature of 320° C. and a tool temperature of 90° C., and a dynamic pressure of 100 bar and a holding pressure of 400 bar at the flow path end of a mold arm having a vent gap dimension of 30 μm, results in burrs having a length G of at most 30 μm, and the at least one partially crystalline, partially aromatic polyamide (A) has a glass transition temperature of at least 105° C.

2. The polyamide molding material according to claim 1, wherein the at least one partially crystalline, partially aromatic polyamide (A) is PA 6T/10T/6I/10I, which is synthesized from:
100 mol-% dicarboxylic acid component, composed of
72.0 -98.3 mol-% terephthalic acid and
28.0 -1.7 mol-% isophthalic acid
100 mol-% diamine component, composed of
60.0 -85.0 mol-% hexamethylene diamine and
15.0 -40.0 mol-% 1,10-decane diamine.

3. The polyamide molding material according to claim 1, wherein the at least one partially crystalline, partially aromatic polyamide (A) is PA, 6T/10T/6I/10I which is synthesized from:
100 mol-% dicarboxylic acid component, composed of
75.0 -95.0 mol-% terephthalic acid and
25.0 -5.0 mol-% isophthalic acid;
100 mol-% diamine component, composed of
60.0 -75.0 mol-% hexamethylene diamine and
25.0 -40.0 mol-% 1,10-decane diamine.

4. The polyamide molding material according to claim 1, wherein the at least one partially crystalline, partially aromatic polyamide (A) is PA 6T/10T/6I/10I, which is synthesized from:
100 mol-% dicarboxylic acid, composed of
80.0-90.0 mol-% terephthalic acid and
20.0-10.0 mol-% isophthalic acid; and
100 mol-% diamine component, composed of
62. 0-72.0 mol-% hexamethylene diamine and
28.0-38.0 mol-% 1 ,10-decane diamine.

5. The polymide molding material according to claim 1, wherein a relative viscosity of the at least one partially crystalline, partially aromatic polymide (A) is 1.45-2.0, measured using 0.5 g of the at least one partially crystalline, partially aromatic polyamide (A) in 100 ml m-cresol at 20°C.

6. The polyamide molding material according to claim 1, wherein the at least one amorphous polyamide (B) is selected from a group consisting of PA 6I/6T, PA 6I, PA MACMI/12, PA MACMI/MACMT/12, 6I/MACMI/12, PA 6I/6T/MACMI/MACMT, PA 6I/6T/MACMI/MACMT/12, PA MACMI/MACM12, PA MXDI, PA MXDI/6I, PA MXDI/MXDT/6I/6T, PA MXDI/12I, PA 6I/6T/6NDA, PA MACM12, PA MACM14, PA MACM18, PA NDT/INDT, PA MACMT/12, PA MACMI/MACMNDA, PA MACMT/MACMNDA, PA MACMI/MACM36, PA MACMT/MACM36, PA MACMT/MACM12, PA MACM6/11, PA 6I/6T/MACMI/MACMT/MACM12/612, PA 6I/6T/6NDA/MACMI/MACMT/MACMNDA, the laurin lactam being able to be entirely or partially replaced by caprolactam and/or the MACM being able to be replaced up to at most 20 mol-% by PACM.

7. The polyamide molding material according to claim 6, wherein the at least one amorphous polyamide (B) is a PA 6I/6T, in which the portion of the isophthalic acid in relation to the sum of isophthalic acid and terephthalic acid in the PA 6I/6T is 90 to 57 mol-%.

8. The polyamide molding material according to claim 1, wherein the weight ratio of the at least one partially crystalline, partially aromatic polyamide (A) to the at least one amorphous polyamide (B) is in the range of 40:60 to 65:35.

9. The polyamide molding material according to claim 1, wherein the molding material only comprises one polyamide (A) and one polyamide (B) each.

10. The polyainide molding material according to claim 1, wherein the at least one nonhalogenated flame retardant (D) is provided in a quantity of 0 to 13 wt-% in the polyamide molding material.

11. The polyamide molding material according to claim 10, wherein the at least one nonhalogenated flame retardant comprises a flame retardant (D) containing phosphorus.

12. The polyamide molding material according to claim 1, wherein a standard test body, which is produced from such a molding material and injection molded at a melt temperature of 320° C. and a tool temperature of 90° C. having plate-shaped dimensions of 60×60×2 mm, has a warpage, calculated as the difference between the transverse and longitudinal processing shrinkage according to ISO standard 294, of at most 0.22%.

13. A molded part produced by injection molding from a molding material according to claim 1, wherein the molded part has an amorphous or less crystallized surface region and a partially crystalline core region.

14. The polyamide molding material according to claim 5, wherein the relative viscosity of the at least one partially crystalline, partially aromatiepolyamide (A) is 1.5-1.9, measured using 0.5 g of the at least one partially crystalline, partially aromatic polyamide (A) in 100 ml m-cresol at 20° C.

15. The polyamide molding material according to claim 7, wherein the portion of the isophthalic acid in relation to the sum of isophthalic acid and terephthalic acid in the PA 6I/6T is 85 to 60 mol-%.

16. The polyamide molding material according to claim 7, wherein the portion of the isophthalic acid in relation to the sum of isophthalic acid and terephthalic acid in the PA 6I/6T is 75 to 60 mol-%.

17. The polyamide molding material according to claim 7, wherein the portion of the isophthalic acid in relation to the sum of isophthalic acid and terephthalic acid in the PA 6I/6T is 72 to 63 mol-%.

18. The polyamide molding material according to claim 8, wherein the weight ratio of the at least one partially crystalline, partially aromatic polyamide (A) to the at least one amorphous polyamide (B) is in the range of 40:60 to 60:40.

19. The polyamide molding material according to claim 8, wherein the weight ratio of the at least one partially crystalline, partially aromatic polyamide (A) to the at least one amorphous polyamide (B) is in the range of 45:55 to 56:44.

20. The potyamide molding material according to claim 8, wherein the weight ratio of the at least one partially crystalline, partially aromatic polyamide (A) to the at least one amorphous polyamide (B) is in the range of 45:55 to 49:51.

21. The polyamide molding material according to claim 10, wherein the at least one nonhalogenated flame retardant (D) is provided in a quantity of 9 to 13 wt.-% in the polyamide molding material.

22. The polyamide molding material according to claim 10, wherein the at least one nonhalogenated flame retardant (D) is provided in a quantity of 10 to 12 wt.-% in the polyamide molding material.

23. The polyamide molding material according to claim 6, wherein the MACM is able to be replaced up to at most 10 mol-% by PACM.

24. The polyamide molding material according to claim 11, wherein the flame retardant (D) containing phosphorus contains salts of phosphinic acid and/or diphosphinic acid and/or the polymers thereof.

* * * * *